United States Patent
de la Iglesia et al.

(10) Patent No.: US 8,214,608 B2
(45) Date of Patent: Jul. 3, 2012

(54) BEHAVIORAL MONITORING OF STORAGE ACCESS PATTERNS

(75) Inventors: Erik de la Iglesia, San Jose, CA (US); Som Sikdar, San Jose, CA (US)

(73) Assignee: GridIron Systems, Inc., Sunnyvale, CA (US)

( * ) Notice: Subject to any disclaimer, the term of this patent is extended or adjusted under 35 U.S.C. 154(b) by 264 days.

(21) Appl. No.: 12/605,160

(22) Filed: Oct. 23, 2009

(65) Prior Publication Data

US 2010/0115211 A1  May 6, 2010

Related U.S. Application Data

(60) Provisional application No. 61/111,310, filed on Nov. 4, 2008.

(51) Int. Cl.
G06F 12/00 (2006.01)
(52) U.S. Cl. ......... 711/156; 711/114; 711/115; 711/137
(58) Field of Classification Search ................. None
See application file for complete search history.

(56) References Cited

U.S. PATENT DOCUMENTS

| | | | |
|---|---|---|---|
| 6,401,147 B1 | 6/2002 | Sang | |
| 6,678,795 B1 | 1/2004 | Moreno et al. | |
| 6,721,870 B1 | 4/2004 | Yochai et al. | |
| 6,789,171 B2 | 9/2004 | Desai et al. | |
| 7,089,370 B2 * | 8/2006 | Luick | 711/137 |
| 7,856,533 B2 | 12/2010 | Hur et al. | |
| 7,870,351 B2 * | 1/2011 | Resnick | 711/155 |
| 7,873,619 B1 | 1/2011 | Faibish et al. | |
| 7,975,108 B1 * | 7/2011 | Holscher et al. | 711/137 |
| 2003/0012204 A1 | 1/2003 | Czeiger et al. | |
| 2005/0025075 A1 | 2/2005 | Dutt et al. | |
| 2005/0195736 A1 | 9/2005 | Matsuda | |
| 2006/0034302 A1 | 2/2006 | Peterson | |
| 2006/0053263 A1 | 3/2006 | Prahlad et al. | |
| 2006/0075191 A1 | 4/2006 | Lolayekar et al. | |
| 2007/0118710 A1 | 5/2007 | Yamakawa et al. | |
| 2008/0320269 A1 | 12/2008 | Houlihan et al. | |
| 2009/0006745 A1 | 1/2009 | Cavallo et al. | |
| 2009/0110000 A1 | 4/2009 | Brorup | |
| 2009/0276588 A1 | 11/2009 | Murase | |
| 2011/0258362 A1 | 10/2011 | McLaren et al. | |

OTHER PUBLICATIONS

Rosenblum, Mendel and Ousterhout, John K., The LFS Storage Manager. Proceedings of the 1990 Summer Usenix. 1990 pp. 315-324.

* cited by examiner

*Primary Examiner* — Shawn X Gu
(74) *Attorney, Agent, or Firm* — Stolowitz Ford Cowger LLP (57) ABSTRACT

A storage control system monitors storage operations directed to storage blocks in a storage device. The storage control system uses arrays of counters to track a number of the storage operations, sizes of the storage operations, types of transitions between the storage operations, and time durations between different types of successive storage operations. The storage blocks are classified into different behavioral groups based on the access pattern history of the individual blocks. The behavioral group classifications are then used by the storage control system to determine when to access the storage blocks from the storage device, when to load the storage blocks into a tiering media, or when to time out the storage blocks from the tiering media.

22 Claims, 7 Drawing Sheets

| | t < 10 | 10<t<50 | 50<t<200 | 200<t<500 | 500<t |
|---|---|---|---|---|---|
| R/R | cnt | 1 | cnt | cnt | 1 |
| R/W | 1 | cnt | 1 | cnt | cnt |
| W/R | 1 | cnt | 1 | cnt | cnt |
| W/W | cnt | 1 | cnt | cnt | cnt |

/- 22

| | s < 10 | 10<s<100 | 100<s<1000 | 1000<s |
|---|---|---|---|---|
| Rd | 1 | 1 | 3 | cnt |
| Wr | cnt | 2 | 1 | cnt |

FIG. 4A

| Operation Order | Current Operation | Type of Previous Operation | Time Elapsed since Previous Operation | Change to State Record |
|---|---|---|---|---|
| 1 | Read 50 Blocks Time 10 | None | None | No change to transition counters Increment Rd 10<S<100 counter |
| 2 | Read 150 Blocks Time 40 | Read | 30 | Increment R/R 10<t<50 counter Increment Rd 100<s<1000 counter |
| 3 | Write 20 Blocks Time 200 | Read | 160 | Increment R/W 50<t<200 counter Increment Wr 10<s<100 counter |
| 4 | Write 60 Blocks Time 215 | Write | 15 | Increment W/W 10<t<50 counter Increment Wr 10<s<100 counter |
| 5 | Read 300 Blocks Time 300 | Write | 85 | Increment W/R 50<t<200 counter Increment Rd 100<s<1000 counter |
| 6 | Read 5 Blocks Time 1000 | Read | 700 | Increment R/R 500<t counter Increment Rd s<10 counter |
| 7 | Write 250 Blocks Time 1005 | Read | 5 | Increment R/W t<10 counter Increment Wr 100<s<1000 counter |
| 8 | Read 120 Blocks Time 1010 | Write | 5 | Increment W/R t<10 counter Increment Rd 100<s<1000 counter |

BEHAVIORAL MONITORING OF STORAGE ACCESS PATTERNS

This application claims priory to provisional patent application Ser. No. 61/111,310 filed Nov. 4, 2008 and is herein incorporated by reference in its entirety.

BACKGROUND

Current data center environments implement bulk storage as a block level service for use by software. The actual access behavior of the block accesses have many different variables that include the number of processes running on the computer, the priority of these messages, and the nature of interaction of user Input/Output (I/O) with the software.

Prefetching is a technique used for improving the performance of disk and memory systems. Nominal prefetching increases performance by keeping copies of accessed data, in the hope that the cached data will be accessed again. The information required for a successful prefetch algorithm includes:

What data to prefetch

The circumstances under which the prefetch occurs

The length of time to keep prefetched data cached (if no access occurs)

If the wrong data is prefetched, no accesses to the data will occur and no performance improvements will be realized. Likewise, if the right data is fetched at the wrong time, it may be replaced (by other caching data) before the access occurs. Incorrectly specifying the "keep time" will have a similar effect.

SUMMARY

A set of data structures track regional behavior of storage blocks. Parameters are obtained by observing and recording the different types of access to the storage blocks. Examples of the types of parameters derived from the storage block monitoring include elapsed time between accesses to particular storage blocks, type of access (read vs. write) to the storage blocks, and size of the accesses to the storage blocks. These parameters are then used in a causal Bayesian network as a reinforcement/punishment protocol to continuously tune the probabilities of the network. For example, the derived storage block parameters can be used to optimize accesses to a storage array.

The foregoing and other objects, features and advantages of the invention will become more readily apparent from the following detailed description of a preferred embodiment of the invention which proceeds with reference to the accompanying drawings.

DETAILED DESCRIPTION

Figure 1:
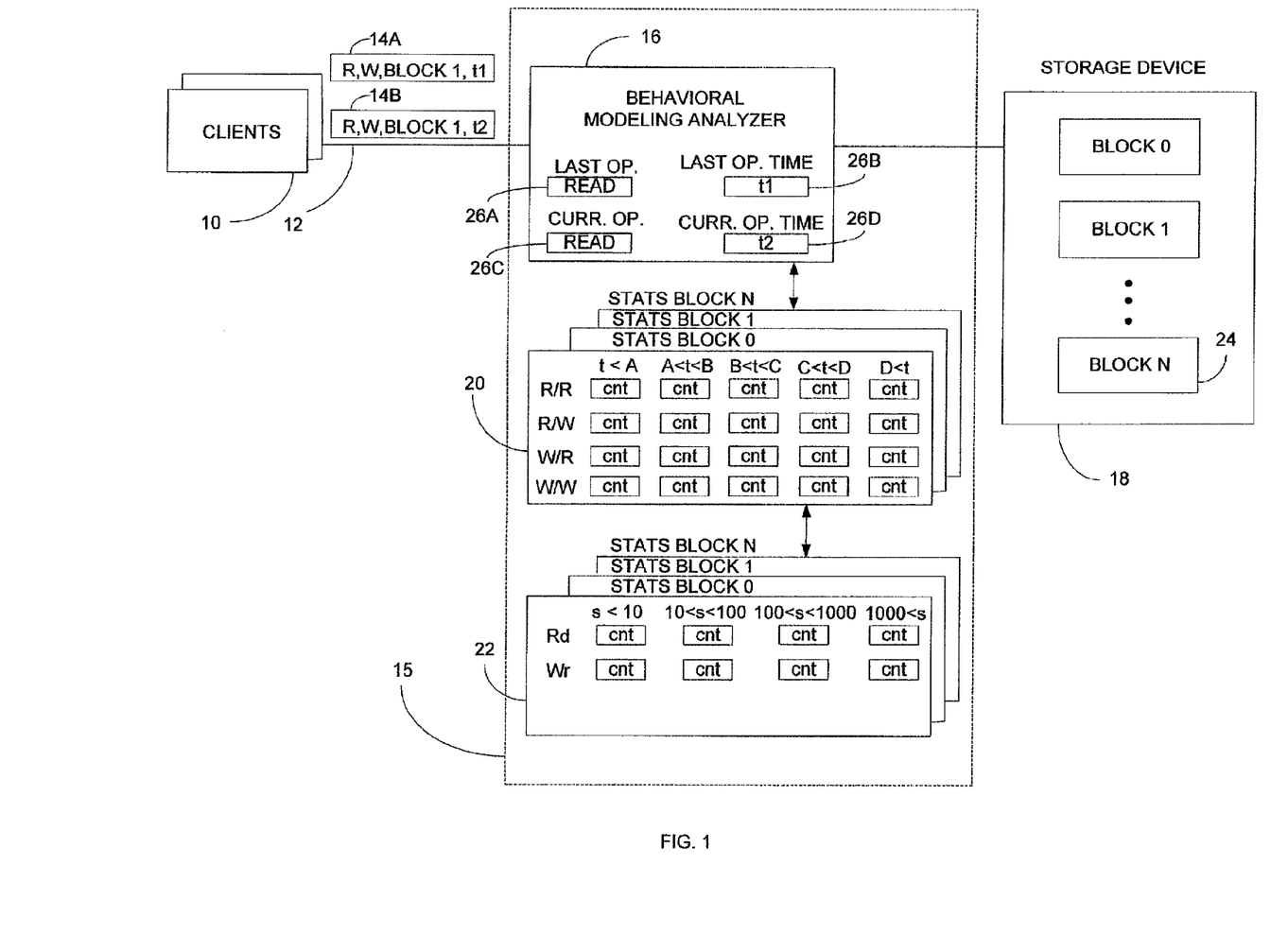
FIG. 1 is a block diagram of a storage system that uses a Behavioral Modeling Analyzer (BMA) to identify storage access patterns.

Referring to FIG. 1, a storage control system 15 is located between a client 10 and a storage device 18. In one example, the client 10 may be a server, personal computer, Personal Digital Assistant (PDA), or any other wired or wireless computing device that needs to access the data in storage device 18. In one embodiment, the storage control system 15 is a stand-alone appliance, device, or blade, and the storage device 18 is a stand-alone disk storage array. In this embodiment, the client 10, storage control system 15, and storage device 18 are each coupled to each other via wired or wireless Internet connections 12.

In another embodiment, the client 10 may be a processor in a personal computer that accesses one or more storage devices 18 over an internal or external data bus. The storage control system 15 in this embodiment could be located in the personal computer or server 10, or could also be a stand-alone device coupled to the computer/client 10 via a computer bus or packet switched network connection.

The storage control system 15 operates a Behavioral Modeling Analyzer (BMA) 16 that identifies storage access patterns between the clients 10 and storage device 18. The BMA 16 can operate in both a monitoring mode and an active mode. During the monitoring mode, read and write operations 14 from client 10 to storage device 18 are recorded. When sufficient information about the storage operations 14 has been gathered, BMA 16 switches from the monitoring mode to an active mode. The active mode performs prefetch, look-ahead, time-outs, and other tiering operations according to the heuristics obtained during the monitoring mode.

During the monitoring mode, the read and write storage operations 14 between the clients 10 and the storage device 18 are recorded by the BMA 16 without reference to the underlying data contained in the read and write operations 14. That is, the type of read or write operation and block specification (address) are noted, but the data actually read or written during the storage operation 14 is ignored.

A last operation type register 26A records the previous type of read or write operation 14A to a particular storage block 24 and a last operation time register 26B records when the previous storage operation 14A happened. A current operation type register 26C captures the current type of read or write operation 14B to that same storage block 24 and a current operation time register 26D records when the current storage operation identified in register 26C happened.

An array of counters 20 record a number of different storage operation sequences. The operation sequences are read followed by read (RR), read followed by write (RW), write followed by read (WR), and write followed by write (WW). Each storage operation sequence maintains a plurality of counters each associated with a different time span range between a particular one of the storage operation sequences.

In one embodiment, a system of five counters is used for each read/write sequence. A first counter is incremented when a time difference between the first operation 14A and the second subsequent operation 14B to the same block 24 is less than a first time unit A. A second counter is incremented if the time difference between operations 14A and 14B is greater than time unit A but less than a time unit B. A third counter is incremented if the time difference between operations 14A and 14B directed to a particular block and for a particular storage sequence is greater than time unit B but less than a time unit C. A fourth counter is incremented if the time difference between operations 14A and 14B for a particular block and particular storage sequence is greater than value C but less than time unit D, and a fifth counter is incremented when the time difference is greater than the time unit D.

The values of time units A, B, C and D are chosen arbitrarily based on experimental knowledge and behavioral models of storage systems. For example, time units A, B, C and D could be in the same or different magnitudes of microseconds, milliseconds, seconds, minutes, hours, or even days.

Each storage block 24 may be accessed by the one or more clients 10 as part of an operation 14 that identifies multiple different contiguous block addresses. Each storage block 24 also has an associated set of counters 22 identifying the number of blocks accessed during the operations 14. For example, the storage blocks 24 may each comprise 64 Kbytes. A single read operation 14 may comprise a read to blocks 50 through 200. The BMA 16 increments the Rd counters 22 associated with each of the blocks 50-200 identified in the read operation. The size of each storage operation 14 is also recorded by incrementing the Rd counter 22 associated with 100<s<1000.

In one embodiment, the block range thresholds 10, 100 and 1000 are chosen based on experimental knowledge. Of course, other gradations could also be used. The corresponding counters 22 record the four memory access ranges less than 10 blocks, greater than 10 blocks but less than 100 blocks, greater than 100 blocks but less than 1000 blocks and greater than 1000 blocks, respectively, for each read and write operation 14.

Table 1.0 summarizes the different counters used by the BMA 16.

TABLE 1.0

| Register Name | Description |
|---|---|
| LAST OP. 26A | Previous Read or Write Operation |
| LAST OP. TIME 26B | Time of Previous Read or Write Operation |
| CURR. OP 26C | Current Read or Write Operation |
| CURR. OP. TIME 26D | Time of Current Read or Write Operation |
| R/R Counters 20 (1 . . . 5) | One counter for each of five time buckets incremented when a read operation to a particular block is followed by another read |
| R/W Counters 20 (1 . . . 5) | One counter for each of five time buckets incremented when a read operation to a particular block is followed by a write |
| W/R Counters 20 (1 . . . 5) | One counter for each of five time buckets incremented when a write operation to a particular block is followed by a read |
| W/W Counters 20 (1 . . . 5) | One counter for each of five time buckets incremented when a write operation to a particular block is followed by another write |
| Read Size Counter 22 (1 . . . 4) | One counter for each of four block ranges incremented when a particular read operation accesses a number of blocks within a particular range |
| Write Size Counter 22 (1 . . . 4) | One counter for each of four block ranges incremented when a particular write operation accesses a number of blocks within a particular range |

The counters 20 and 22 are used for tracking sequences of storage block operations according to time and size and can be used for creating access profiles for each storage block 24. As the number of accesses to the storage device 18 increase, the BMA 16 obtains more information regarding the traits of the storage operations 14 for different storage blocks 24. The BMA 16 uses this information to optimize use of the tiering resources 38 shown in FIG. 2 and, in turn, increase the performance of the overall storage control system 15.

Figure 2:
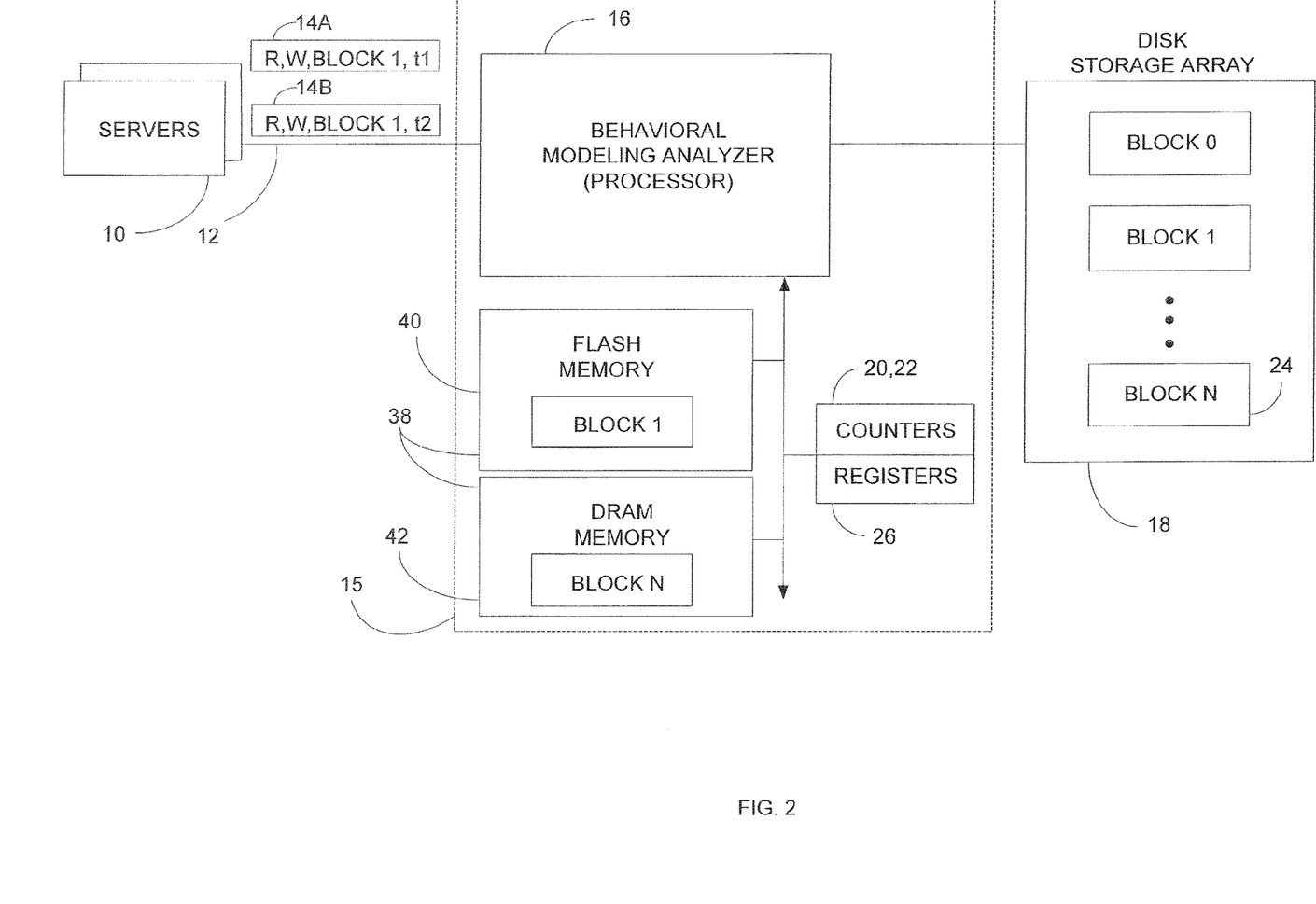
FIG. 2 shows how storage access patterns identified by the BMA might be used for accessing data in a storage device.

Referring to FIG. 2, a local memory 38 in storage control system 15 is alternatively referred to as a tiering resource or tiering media. The local memory 38 can include different types of Flash memory 40 and/or Dynamic Random Access Memory (DRAM) 42, or even disk memory. However, in general all of local memory 38 has a relatively faster access time than the storage device 18.

Based on the statistics recorded in counters 20 and 22, the BMA 16 may access different storage blocks 24 from storage device 18 or temporarily store or time out the storage blocks in local memory 38. These statistical based storage operations allow the storage control system 15 to more efficiently access particular storage blocks 24 on behalf of the clients 10.

Behavioral Modeling Examples

A first example of a storage operation sequence received and recorded by the BMA 16 includes a first read to blocks 1000-1099 at time T=10 sec followed by a second read to blocks 1000-1099 at time T=15 sec.

Example Transaction (Times Relative to Start of Tracking)
Transaction 1) Time: 10 sec, Read of Blocks 1000 to 1099
Transaction 2) Time: 15 sec, Read of Blocks 1000 to 1099
Time between transactions: 15 sec–10 sec=5 sec
Blocks transferred=1099–1000=100 (inclusive)
The type of transaction is identified as a Read followed by Read=R/R.

A previous state of the counters 20 associated with a particular storage block 26 after the first transaction 1 may be as follows.

| Counters 20 | Below 2 sec | 2-4 sec | 4-6 sec | 6-8 Sec | Above 8 sec |
|---|---|---|---|---|---|
| R/R | — | — | 20 | — | — |
| R/W | — | — | — | — | — |
| W/R | — | — | — | — | — |
| W/W | — | — | — | — | — |

A previous state of the counters 22 for that same particular block 26 after the first transaction 1 may be as follows.

| Counter 22 | 1-10 Blocks | 11-50 Blocks | 51-250 Blocks | 251-500 Blocks | Above 500 Blocks |
|---|---|---|---|---|---|
| Read | — | — | 3 | — | — |
| Write | — | — | — | — | — |

After the second transaction 2, the BMA 16 increments the counters 20 associated with a 5 second time interval between the two sequential read operations for each of blocks 1000-1099 as follows.

| Counters 20 | Below 2 sec | 2-4 sec | 4-6 sec | 6-9 Sec | Above 8 sec |
|---|---|---|---|---|---|
| R/R | — | — | 21 | — | — |
| R/W | — | — | — | — | — |
| W/R | — | — | — | — | — |
| W/W | — | — | — | — | — |

The BMA 16 also increments the counters 22 associated with the second 100 block read operation during transaction 2 for each of blocks 1000-1099.

| Counters 22 | 1-10 Blocks | 11-50 Blocks | 51-250 Blocks | 251-500 Blocks | Above 500 Blocks |
|---|---|---|---|---|---|
| Read | — | — | 4 | — | — |
| Write | — | — | — | — | — |

Figure 3:
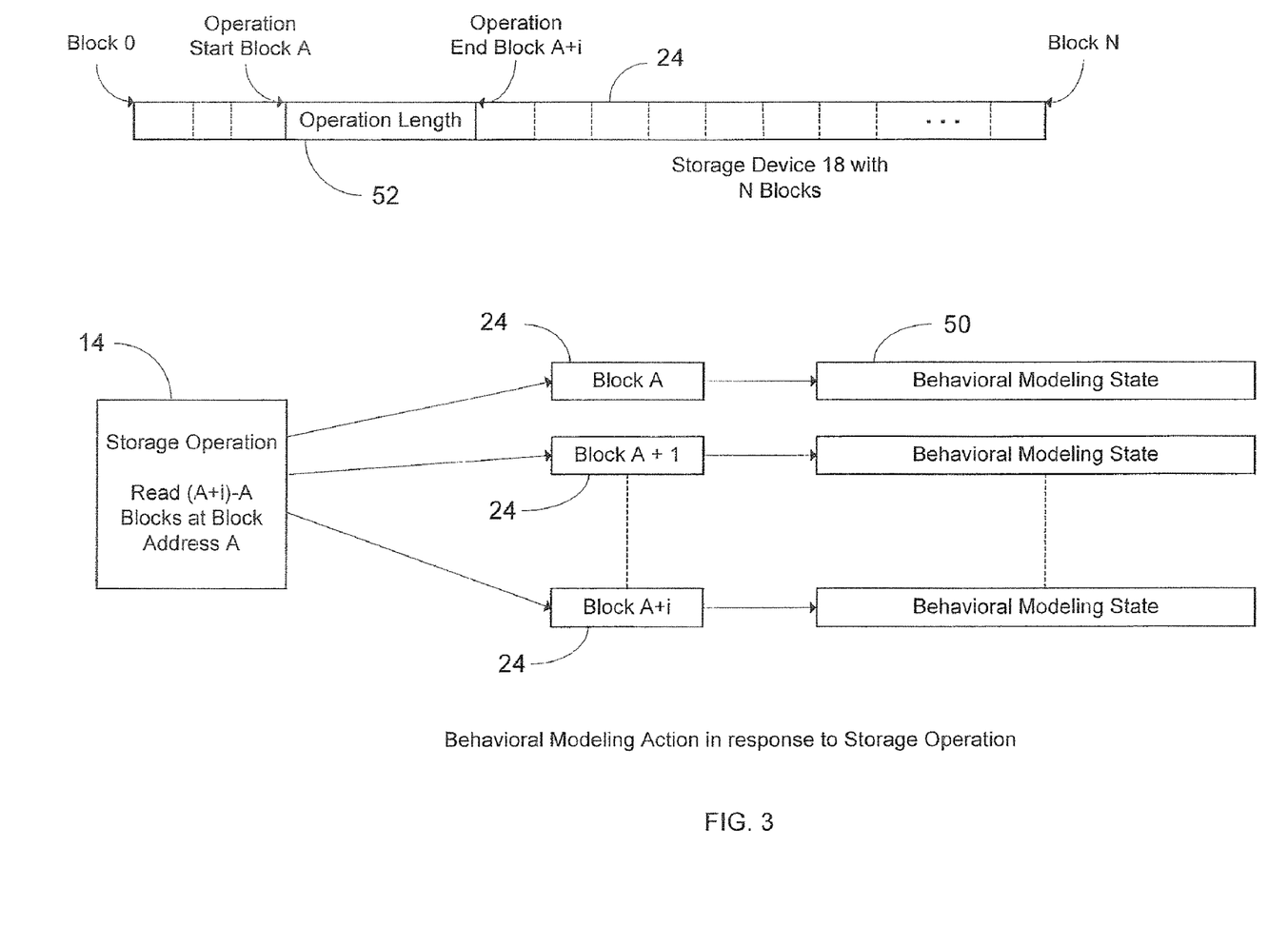
FIG. 3 is a diagram showing how different behavioral modeling states are tacked for individual storage blocks in a storage device.

FIG. 3 shows behavioral modeling states associated with each of the storage blocks 24 in storage device 18. As described above, in one embodiment, the storage device 18 is a disk array that has one or more disks partitioned into multiple storage blocks 24. The storage operations 14 initiated by the clients 10 in FIG. 1 may include a starting block address A for a particular block and an ending block address A+i for a particular read or write operation. In this example, all the blocks between block A and block A+i are read.

The BMA 16 identifies each of the blocks 24 between block A and block A+i associated with the storage operation 14 and identifies an operation length 52 of the storage operation 14. For example, if block A is the $100^{th}$ block in storage device 18 and block A+i is the $999^{th}$ block in the storage device 18, the operation length 52 for storage operation 14 is 900.

As also explained above, separate behavioral modeling state information 50 is kept for each storage block 24 based on a tracked history of the storage operations 14. In the examples provided above, the behavioral modeling state information 50 includes the last and current operation type counters 26A and 26C, respectively, and the last and current time counters 26B and 26D, respectively. The behavioral modeling state information 50 also includes the information tracked in transition time counters 20 and the information in the block size counters 22.

Figure 4A:
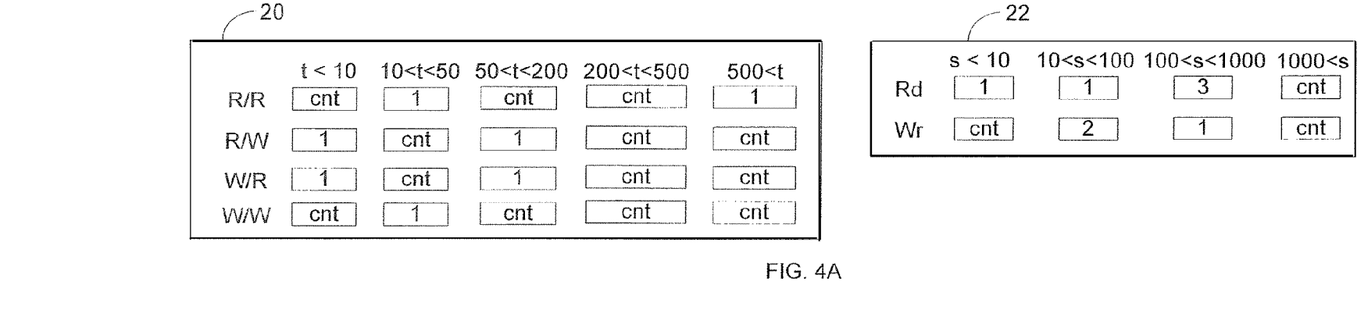
FIGS. 4A and 4B show one example of how the behavioral modeling state is tracked for a particular storage block.
Figure 4B:
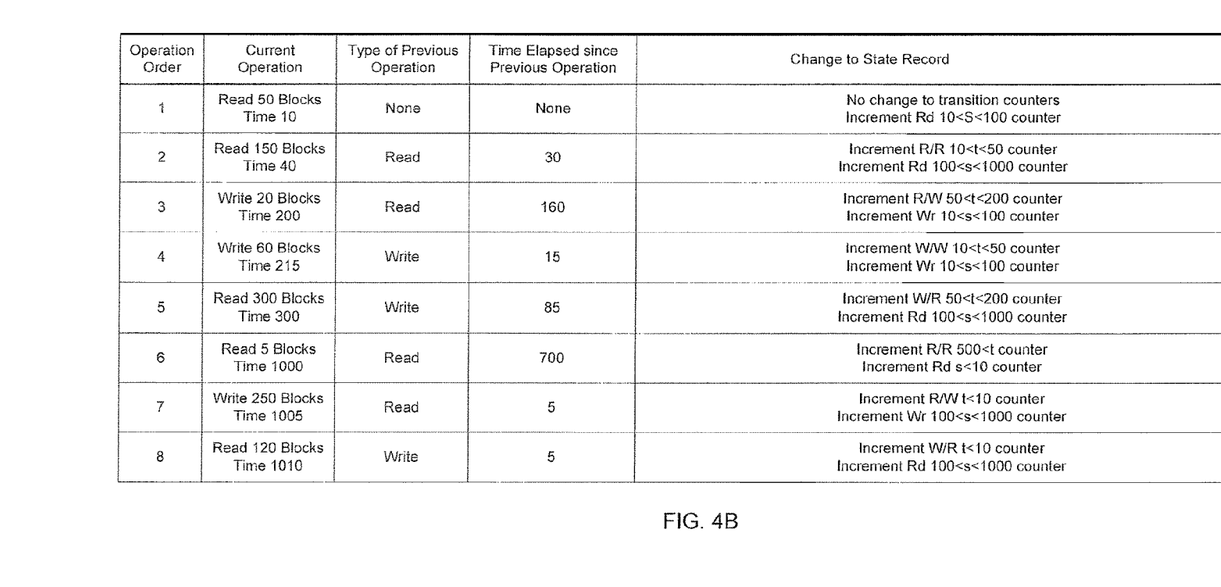

FIGS. 4A and 4B show another example of how the BMA 16 tracks the behavioral modeling states 50 for the different blocks 24. The transition time counters 20 and block size counters 22 in FIG. 4A may all initially be zeroed out. The transition time counters 20 and block size counters 22 in FIG. 4A are associated with one particular block that is accessed by each of the operations described in FIG. 4B. For example, each block read or write operation in FIG. 4B accesses the storage block associated with the time counters 20 and block size counter 22 in FIG. 4A.

A first operation in FIG. 4B reads 50 blocks at time 10. Again one of the 50 blocks read at time 10 is associated with the transition time counters 20 and block size counters 22 in FIG. 4A. Since this is the first operation, there is no change to the transition time counters 20. The Rd counter 22 for Rd 10<s<100 in incremented to 1.

The second operation reads 150 blocks at time 40. Again one of the 150 blocks read at time 40 is associated with the transition time counters 20 and block size counters 22 in FIG. 4A. The R/R time counter 20 10<t<50 is incremented since 30 time units have expired since the last read to this particular block in operation 1. The block size Rd counter 22 for 100<s<1000 is incremented since 150 blocks were read in operation 2.

Operation 3 writes 20 blocks at time 200. Again one of the 20 blocks written to at time 200 is associated with the particular block associated with the time counters 20 and block size counters 22 in FIG. 4A. The R/W time counter 20 for 50<t<200 is incremented since 160 time units have expired since the last read operation to this particular block. The block size Wr counter 22 for 10<s<100 is incremented since 20 blocks were written in operation 3.

Operation 4 writes 60 blocks at time 215. The W/W time counter 20 for 10<t<50 is incremented since 15 time units have expired since the previous write operation to this particular block in operation 3. The block size Wr counter 22 for 10<s<100 is incremented since 215 blocks were written in operation 4.

Operation 5 reads 300 blocks at time 300. The W/R time counter 20 for 50<t<200 is incremented since 85 time units have expired since the last write to this particular block in operation 4. The block size Rd counter 22 for 100<s<1000 is incremented since 300 blocks were read in operation 5.

Operation 6 reads 5 blocks at time 1000. The R/R time counter 20 for 500<t is incremented since 700 time units have expired since the last read to this particular block in operation 5. The block size Rd counter 22 for s<10 is incremented since 5 blocks were read operation 6.

Operation 7 writes 250 blocks at time 1005. The R/W time counter 20 for t<10 is incremented since 5 time units have expired since the last read operation to this particular block in previous operation 6. The block size Wr counter 22 for 100<s<1000 is incremented since 250 blocks were written in operation 7.

Operation 8 reads 120 blocks at time 1010. The W/R time counter 20 for t<10 is incremented since 5 time units have expired since the last write operation to this particular block in previous operation 7. The block size Rd counter 22 for 100<s<1000 is incremented since 120 blocks were read in operation 8.

At the end of the 8 storage operations, the counters 20 contain the behavioral state of the transition times between sequential accesses to this particular block and counters 22 contain the behavioral state for the range of block accesses that included this particular storage block.

Figure 5A:
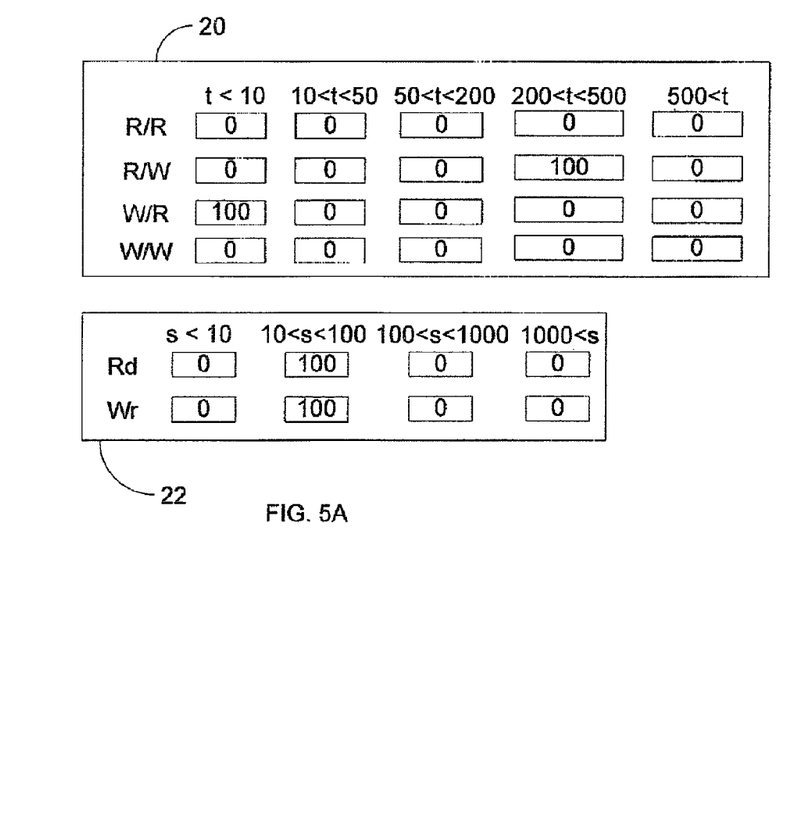
FIGS. 5A and 5B show how a storage block may be associated with a fast timeout group.
Figure 5B:
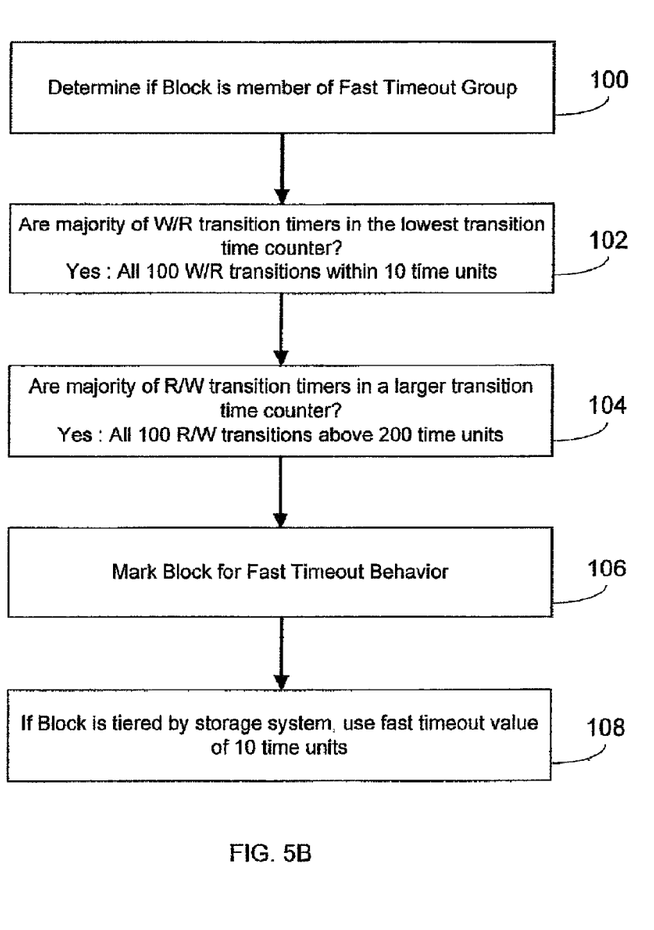

FIG. 5B shows one example of how the behavioral state for a particular block identified by counters 20 and 22 in FIG. 5A is used by the BMA 16 to perform a fast timeout operation. In the current behavioral state for this particular block, the transition time counters 20 indicate a W/R count of 100 for t<10 and a R/W count of 100 for 200<t<500. The block size counters 22 indicate a Rd count of 100 for the block range 10<s<100 and a Wr count of 100 for the block range 10<s<100.

In operation 100 the BMA 16 starts a process for determining if any blocks in the storage device 18 should be labeled as members of a fast timeout group. A fast timeout group identifies blocks that can be removed relatively quickly after being loaded into the tiering media 38 in FIG. 2.

Operation 102 first determines if a particular block has a majority of W/R transition counters 20 for t<10. In this example, all of the W/R transitions are less than 10 time units. Therefore the condition in operation 102 is true. The BMA 16 in operation 104 then determines if the particular block has a majority of R/W time counters 20 in a substantially larger transition time period. In this example, all of the R/W transitions are above 200 time units. Therefore the condition in operation 104 is also true.

The quick transitions identified for the W/R time counters 22 in operation 102 indicate that this particular block after being written to is then quickly read. The long time periods between the R/W transitions in operation 104 also indicates that this particular block after being read is not accessed again for a relatively long period of time until there is another write to that same block (W/R transition).

There are no sequential R/R transitions for this block. This indicates that after the block is read, it will likely not be read again until a next write operation. There are also no sequential W/W transitions for this block. This indicates that after the block is written, it will likely not be written to again until after a next read operation.

Thus, the block associated with the counters in FIG. 5A is labeled by the BMA 16 for fast timeout in operation 106. Whenever this block is written to, it may be determined to be a good candidate for temporary storage in the local tiering media 38. Alternatively, the block could be placed in a low priority status after residing in the tiering media 38 for more than 10 time units. The tiering media 38 is more efficiently utilized since the fast timeout blocks are not stored in the local tiering media 38 any longer than necessary. This increases availability of the tiering media 38 for other storage operations.

Figure 6A:
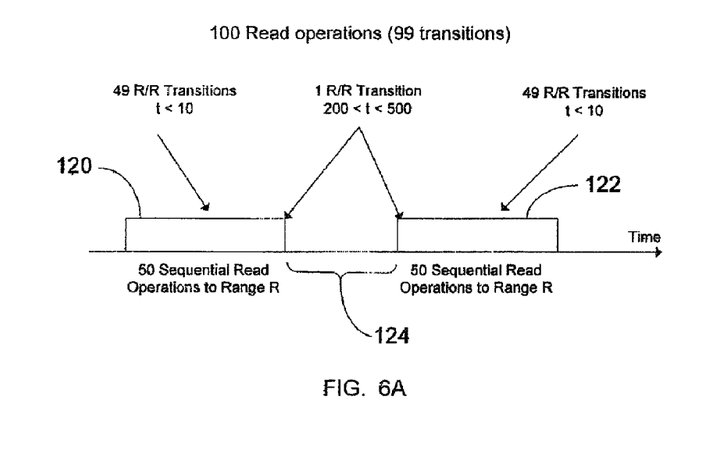
FIGS. 6A-6C show how a storage block may be associated with a read-ahead operation.
Figure 6B:
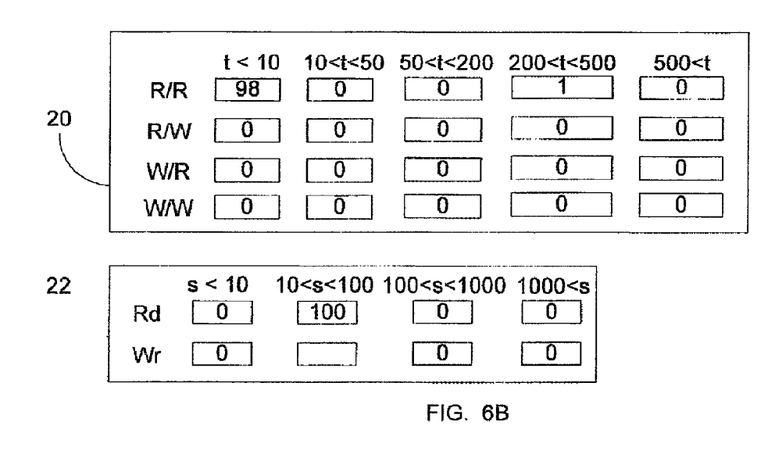
Figure 6C:
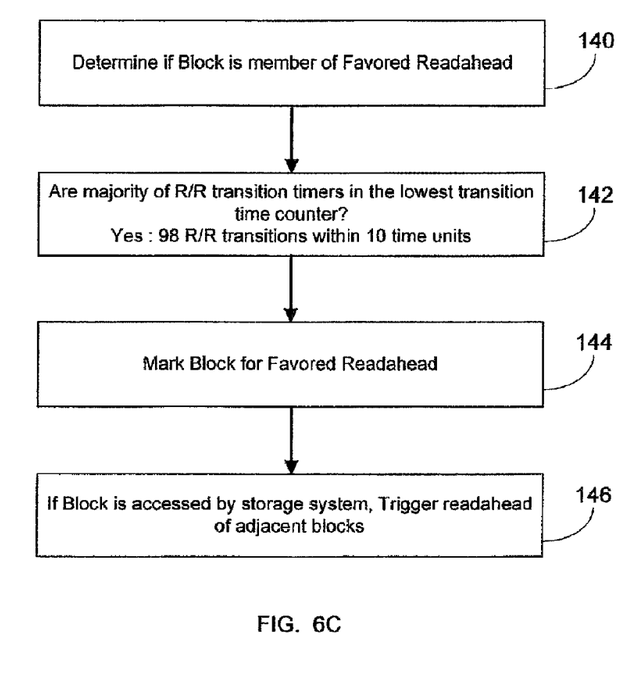

FIGS. 6B and 6C show how a favored read ahead operation can be performed based on the state information contained in counters 20 and 22. A favored read ahead operation determines if other subsequent blocks should be read based on a read to a first particular block.

FIG. 6A is a diagram showing read operations 120 performed by one or more of the clients 10 in FIG. 1. In this example, a succession of back to back read operations (R/R) are performed in less than 10 time units (t<10). The read operations 120 are for a particular range of blocks R. After a series of 50 read operations to the block range R, there is a relatively long time lapse 124 (200<t<500) until another series of 50 relatively fast successive back to back read operations 122 (t<10) are performed for the same block range R.

FIG. 6B show the transition time counters 20 and block size counters 22 reflecting the state for a particular one of the blocks involved in the read operations shown in 6A. The counters 20 and 22 are incremented by the BMA 16 according to the read operations shown in FIG. 6A. FIGS. 4A and 4B previously provided one example of how the BMA 16 populates the values in the counters 20 and 22.

In this example, the BMA 16 recorded 98 R/R transitions for t<10 and 1 R/R transition for 200<t<500 in transition time counters 20. In addition, the BMA 16 recorded 100 Rd operations each having a block range of 10<s<100 in block counters 22. Note that for 100 read operations there will only be 99 R/R transitions recorded in transition time counters 20 since there is no read/read transition for the first read operation.

In FIG. 6C, the BMA 16 begins a process in operation 140 for identifying different blocks that are members of a favored read ahead group. In operation 142 the BMA 16 identifies any blocks having a majority of R/R transitions in the lowest time range t<10. In this example, the counters 20 for this particular block have 98 R/R transitions where t<10 and only one R/R transition where 200<t<500. Therefore, the read ahead state in operation 142 is true. Accordingly, the block associated with counters 20 and 22 in FIG. 6B is marked as a read ahead block in operation 144.

The BMA 16 also lists the adjacent blocks that are part of the same read ahead group. For example, the block size 10<s<100 range in counters 22 may be used to determine the range of the adjacent block read ahead. The lower end range 10, upper end range 100, or half of the upper end range 100 could be used as the range of adjacent blocks that are grouped together as part of the read ahead operation.

In operation 146, the BMA identifies a read to one of the blocks labeled for read ahead. The BMA 16 then triggers a read ahead for a range R of blocks adjacent to the identified block for reading from the storage device 18 at the same time.

Any variety of timeout schemes, such as the timeout scheme described above, could then be used for determining how long the read ahead blocks are temporarily stored in the tiering media 16. In another example, the total number of read operations indicated by registers 20 (100) could be divided by the number of relatively long R/R transitions in 200<t<500 plus one. The resulting number could then be multiplied by the threshold time period (10) associated with counter t<10. Thus, 100÷(1+1)=50×10=500 time units.

Figure 7A:
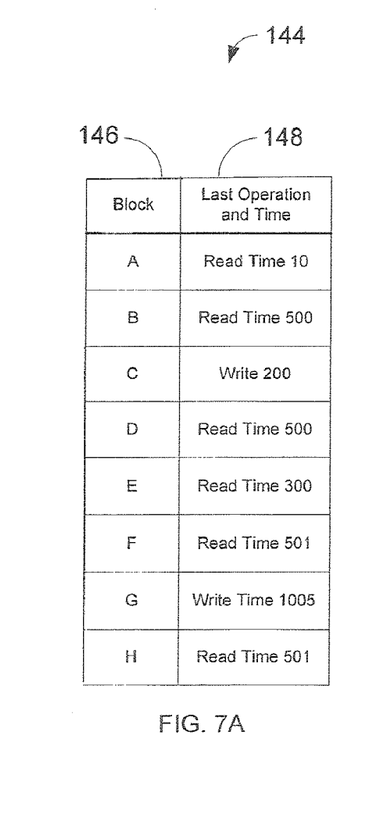
FIGS. 7A-7C show how a storage block may be associated with a prefetch group.
Figure 7B:
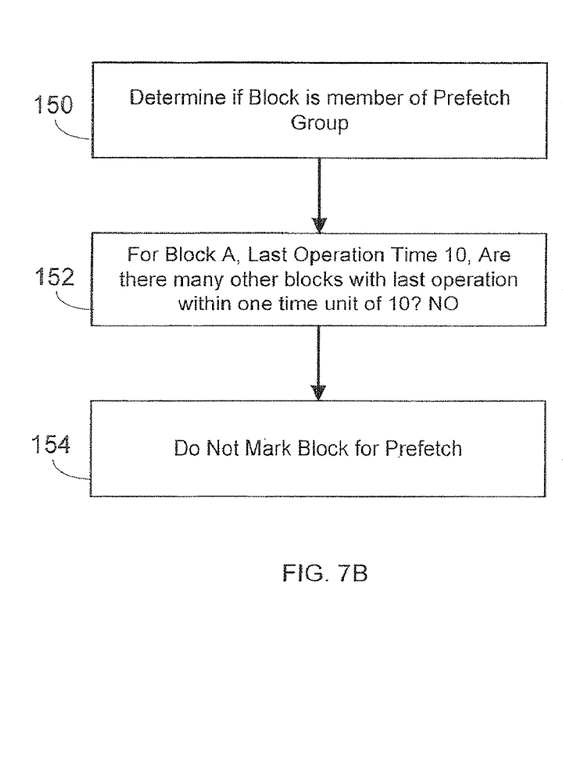
Figure 7C:
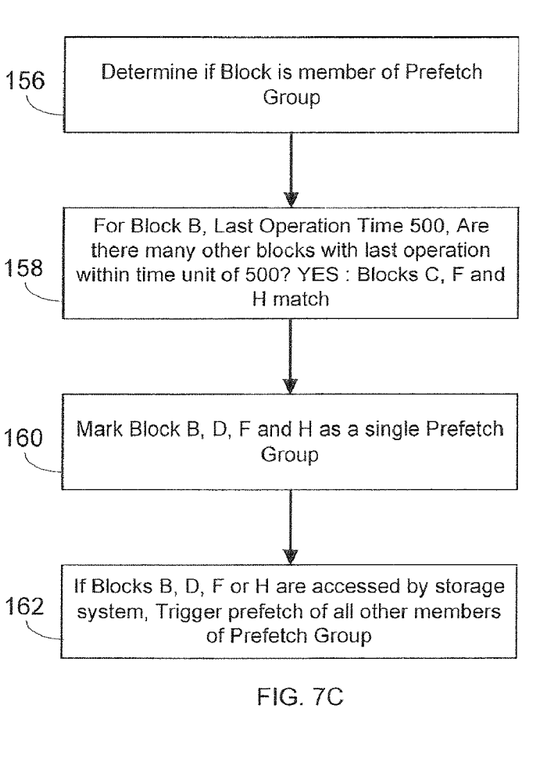

FIGS. 7A-7C show how storage blocks can be associated with a same prefetch group. FIG. 7A shows a table 144 containing an example set of operations performed by one or more of the clients 10 in FIG. 1. A first column 146 in the table 144 identifies blocks accessed by the clients 10 and a second column 148 identifies the last storage operation and the time of the last storage operation directed to the block identified in column 146. The information in table 144 is obtained by the BMA 16 from the registers 26 associated with the different blocks as shown above in FIG. 1.

Referring to FIG. 7B, the BMA 16 in operation 150 determines if any of the blocks in table 144 should be members of a same prefetch group. In operation 152, the BMA 16 identifies the last operation time t=10 for block A. Since there are no other blocks B-H that have a last operation time within +/−one time unit of t=10 block A is not marked as part of a prefetch group in operation 154.

The BMA 16 in operation 156 of FIG. 7C continues through the table 144 to determine if any of the other blocks B-H should be listed as part of a same prefetch group. In operation 158, the BMA 16 determines the last read operation for block B happened at t=500. The BMA 16 determines in operation 158 that blocks D, F, and H in table 144 also had storage operations within one time unit of t=500. Of course some time range other from a single time unit could also be used to determine if blocks should be combined in a same prefetch group. The time range could also be dynamically varied according to current operating conditions of the storage control system 15.

The BMA 16 in operation 160 marks each of the blocks B, D, F, and H as part of the same prefetch group. The next time any of the blocks B, D, F, or H is accessed by one of the clients 10, the BMA 16 will then prefetch all of the blocks from the prefetch group from the storage control system 15 and load the blocks into the local tiering media 38. Other timeout parameters as described above in FIGS. 5 and 6 could then be used to determine when the storage blocks in the prefetch group should time out in the local tiering media 38.

FIGS. 5-7 show examples of how the behavioral modeling states 50 in FIG. 3 are tracked for each of the different blocks 24 in storage device 18 and then used to dynamically control what blocks are accessed from storage device 18, what blocks are temporarily stored in the local tiering media 38, and what blocks are quickly timed out in the tiering media 38. Other storage operations can also be based on the behavioral modeling state information 50 described above and are not limited to the examples provided above.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We/I claim all modifications and variation coming within the spirit and scope of the following claims.

The invention claimed is:

1. A storage control system, comprising:
   logic circuitry configured to monitor storage operations accessing a storage device;
   counters used by the logic circuitry to track times when different storage operations access the storage device; and
   a local tiering medium used by the logic circuitry to store data from the storage device according to the times tracked in the counters.

2. The storage control system according to claim 1 wherein the logic circuitry is configured to calculate a transition time between a last storage operation and a current storage operation to a same block address in the storage device and store the transition time in an associated one of the counters.

3. The storage control system according to claim 1 further comprising:
   last operation registers each configured to record last operations performed on associated storage blocks in the storage device;
   last time registers each configured to record previous times the last operations were performed on the associated storage blocks;
   current operation registers each configured to record current operations performed on the associated storage blocks in the storage device; and
   current time registers each configured to record current times when the current operations are performed on the associated storage blocks.

4. The storage control system according to claim 3 further comprising an array of transition time counters each identifying transition times between the current times for the current operations and the previous times for the last operations for the associated storage blocks.

5. The storage control system according to claim 4 wherein the array of transition time counters are configured to:
   separately identify successive read to read, read to write, write to read, and write to write accesses to the associated storage blocks; and
   identify transition times between the successive read to read, read to write, write to read, and write to write accesses to the associated storage blocks.

6. The storage control system according to claim 1 including an array of block size counters associated with storage blocks in the storage device.

7. The storage control system according to claim 6 wherein the logic circuitry is configured to:
   identify a number of contiguous blocks addressed by storage operations accessing the storage blocks;
   identify types of read or write operations to the storage blocks; and
   record the number of contiguous blocks and the types of read or write operations in the array of block size counters.

8. The storage control system according to claim 7 wherein different arrays of block size counters are associated with different storage blocks in the storage device.

9. The storage control system according to claim 1 wherein the times tracked in the counters are a relative time offset from a selected time base.

10. A method, comprising:
    monitoring storage operations directed to storage blocks in a storage device;
    identifying a number of the storage operations, sizes of the storage operations, and types of transitions between the storage operations directed to the storage blocks;
    classifying the storage blocks into behavioral groups based on the number of the storage operations, the sizes of the storage operations, and the types of transitions between the storage operations directed to the storage blocks; and
    using the behavioral groups classified for the storage blocks to determine when to read the storage blocks from the storage device, when to load the storage blocks into a tiering medium, or when to remove the storage blocks from the tiering medium.

11. The method of claim 10 further comprising using arrays of counters to track storage access patterns for the individual storage blocks.

12. The method of claim 10 wherein the behavioral groups include a fast timeout group, a read ahead group and a prefetch group.

13. The method of claim 12 further comprising using a fastest available reclamation time for storage blocks associated with the fast timeout group.

14. The method of claim 12 further comprising changing a number of storage blocks read from the storage device for storage blocks associated with the read ahead group.

15. The method of claim 12 further comprising prefetching all of the storage blocks associated with the prefetch group into the tiering medium whenever a storage operation reads at least one of the storage blocks associated with the prefetch group.

16. The method of claim 10 further comprising performing a fast timeout operation on storage blocks to be loaded into the tiering medium when:
    a majority of write to read transitions to the storage blocks have a small time difference;
    a majority of read to write transitions to the storage blocks have a significantly larger time difference; and
    there are no, or a small number, of read to read transitions and write to write transitions to the storage blocks.

17. The method of claim 10 further comprising performing read ahead operations on a group of the storage blocks when:
    the sizes of the storage operations directed to the storage blocks generally fall within a single size range; and
    a majority of read to read transitions to the storage blocks have a small transition time difference.

18. The method of claim 10 further comprising prefetching a group of storage blocks that each have a last access time within a same time range.

19. The method of claim 10 further comprising storing state information for each of the storage blocks and updating the state information for each of the storage blocks according to the storage operations directed to the storage blocks.

20. A storage control system, comprising:
    an array of counters associated with a storage block in a storage device;
    a local memory; and
    a processor configured to:
    monitor storage operations between a client and the storage device,
    identify different types of read and write transitions for storage operations to the storage block, store a history of the different types of read and write transitions in the array of counters, and access the storage block from the storage device according to the history of the different types of read and write transitions stored in the array of counters.

21. The storage control system according to claim 20 wherein the processor is configured to:

track separate numbers in the array of counters for each of the different types of read and write transitions; and store the storage block in the local memory or use the storage block in the local memory according to the separate numbers tracked in the counters for the different types of read and write transitions.

22. The storage control system according to claim 20 wherein the processor is configured to:

use the array of counters to track different amounts of time between different sequences of successive read and write operations; and load the storage block in the local memory or use the storage block in the local memory according to the different amounts of time tracked in the array of counters.

* * * * *